(12) United States Patent
Patil

(10) Patent No.: US 12,615,247 B2
(45) Date of Patent: Apr. 28, 2026

(54) WILDCARD-FREE CERTIFICATES FOR NETWORK ADDRESS DOMAINS

(71) Applicant: eBay Inc., San Jose, CA (US)

(72) Inventor: Yogesh Patil, Davis, CA (US)

(73) Assignee: eBay Inc., San Jose, CA (US)

( * ) Notice: Subject to any disclaimer, the term of this patent is extended or adjusted under 35 U.S.C. 154(b) by 324 days.

(21) Appl. No.: 18/230,920

(22) Filed: Aug. 7, 2023

(65) Prior Publication Data

US 2025/0055839 A1 Feb. 13, 2025

(51) Int. Cl.
*H04L 9/40* (2022.01)

(52) U.S. Cl.
CPC ........ *H04L 63/0823* (2013.01); *H04L 63/108* (2013.01)

(58) Field of Classification Search
CPC ........................... H04L 63/0823; H04L 63/103
See application file for complete search history.

(56) References Cited

U.S. PATENT DOCUMENTS

| | | | | |
|---|---|---|---|---|
| 7,272,714 B2 * | 9/2007 | Nagaratnam | ....... | H04L 63/0823 |
| | | | | 713/157 |
| 8,977,265 B2 | 3/2015 | Lee et al. | | |
| 9,104,836 B2 * | 8/2015 | Burstein | ................ | H04L 63/08 |
| 10,389,528 B2 | 8/2019 | Moysi et al. | | |
| 10,581,829 B1 | 3/2020 | Don et al. | | |

| | | | | |
|---|---|---|---|---|
| 10,673,716 B1 | 6/2020 | Sethuramalingam et al. | | |
| 10,681,035 B1 * | 6/2020 | Kincaid | ................ | H04L 9/0861 |
| 11,204,961 B1 | 12/2021 | Farber et al. | | |

(Continued)

FOREIGN PATENT DOCUMENTS

| | | | |
|---|---|---|---|
| CN | 106470191 A | 10/2019 |
| CN | 110225013 A | 11/2021 |

(Continued)

OTHER PUBLICATIONS

"Automated Certificate Management", Oracle [retrieved Jun. 19, 2023]. Retrieved from the Internet <https://docs.oracle.com/en/cloud/saas/marketing/eloqua-user/Help/CertificateManagement/AutoSSLCert.htm>., 5 Pages.

(Continued)

*Primary Examiner* — Kostas J Katsikis
(74) *Attorney, Agent, or Firm* — FIG. 1 Patents

(57) ABSTRACT

Generating an access point certificate based on a graph that defines relationships between an access point and at least one domain is described. Relationship data describing how data is to be routed between an access point and domains is received by a certificate management system. The certificate management system generates a graph representing an access point and associated domains as nodes, with edges connecting various nodes to model relationships between the access point and the associated domains. Based on the graph, a certificate is generated that individually lists each domain associated with the access point and includes information describing data routing for the domain via the access point. The certificate excludes wildcard entries that represent multiple domains via a single entry. The certificate is used to control data communication traffic via the access point and is updated responsive to changes in in domain relationship data for the access point.

20 Claims, 6 Drawing Sheets

(56) References Cited

U.S. PATENT DOCUMENTS

| | | | |
|---|---|---|---|
| 11,206,275 | B2 | 12/2021 | Nabeel et al. |
| 11,425,114 | B2 | 8/2022 | Shubin et al. |
| 11,444,931 | B1 | 9/2022 | Quevedo |
| 11,743,282 | B1 | 8/2023 | Torkamani et al. |
| 2002/0087859 | A1* | 7/2002 | Weeks .................. G06F 21/604 |
| | | | 713/156 |
| 2003/0070070 | A1 | 4/2003 | Yeager et al. |
| 2003/0233543 | A1 | 12/2003 | Nagaratnam et al. |
| 2004/0264697 | A1 | 12/2004 | Gavrilescu et al. |
| 2011/0210973 | A1* | 9/2011 | Di Crescenzo ......... H04L 43/18 |
| | | | 345/440 |
| 2012/0047394 | A1 | 2/2012 | Jain et al. |
| 2014/0092726 | A1 | 4/2014 | Khan et al. |
| 2015/0213131 | A1 | 7/2015 | Styler et al. |
| 2016/0330164 | A1 | 11/2016 | Bellan et al. |
| 2017/0236079 | A1 | 8/2017 | Venna et al. |
| 2019/0044815 | A1* | 2/2019 | Rosh ...................... H04L 41/22 |
| 2019/0205773 | A1* | 7/2019 | Ackerman .............. G06F 30/20 |
| 2020/0007666 | A1 | 1/2020 | Amin et al. |
| 2020/0137094 | A1 | 4/2020 | Janakiraman |
| 2020/0334365 | A1 | 10/2020 | Buck et al. |
| 2021/0119962 | A1 | 4/2021 | Ramia et al. |
| 2021/0258299 | A1 | 8/2021 | Bruckner et al. |
| 2021/0266185 | A1 | 8/2021 | Konda et al. |
| 2022/0103525 | A1 | 3/2022 | Shribman et al. |
| 2022/0131852 | A1 | 4/2022 | Sharma et al. |
| 2022/0182246 | A1 | 6/2022 | Murphy et al. |
| 2022/0201036 | A1 | 6/2022 | Nabeel et al. |
| 2022/0210146 | A1 | 6/2022 | Dhanabalan et al. |
| 2022/0239696 | A1 | 7/2022 | Konda et al. |
| 2022/0247624 | A1 | 8/2022 | Johnson et al. |
| 2023/0179429 | A1* | 6/2023 | Rosenthol ............. H04L 9/3268 |
| | | | 713/156 |
| 2023/0409215 | A1 | 12/2023 | Kohli et al. |
| 2024/0039732 | A1* | 2/2024 | Luo ....................... H04L 9/3239 |
| 2024/0106861 | A1 | 3/2024 | Ahn et al. |
| 2024/0283809 | A1 | 8/2024 | Sinha et al. |
| 2025/0220011 | A1 | 7/2025 | Patil |

FOREIGN PATENT DOCUMENTS

| | | |
|---|---|---|
| CN | 114422170 A | 1/2023 |
| CN | 110537346 A | 3/2023 |
| CN | 120223349 A | 6/2025 |
| EP | 4580124 A1 | 7/2025 |

OTHER PUBLICATIONS

"EP Search Report", European Application No. 24220460.0, Mar. 31, 2025, 12 pages.

Anderson, et al., "Assessing and Exploiting Domain Name Misinformation", 2023 IEEE European Symposium on Security and Privacy Workshops, 2023, 12 pages.

Shobiri, et al., "CDN's Dark Side Security Problems in CDN-to-Origin Connections", Digital Threats: Research and Practice, vol. 4, No. 1, Articles 3, Mar. 2023, 22 pages.

Amarnani, et al., "Pursuant to MPEP § 2001.06(b) the applicant brings the following co-pending application to the Examiner's attention:", U.S. Appl. No. 19/002,294, filed Dec. 26, 2024, 60 pages.

Das, Arindam, "Azure Front Door: Enhancing Global Application Delivery and Security", Medium, Jul. 1, 2023, 12 pages.

Microsoft, "Mission-critical global HTTP ingress", Apr. 19, 2023, 6 pages.

Patil, "Pursuant to MPEP § 2001.06(b) the applicant brings the following co-pending application to the Examiner's attention:", U.S. Appl. No. 18/397,189, Dec. 27, 2023, 69 pages.

"Non-Final Office Action", U.S. Appl. No. 18/397,189, Sep. 11, 2025, 32 pages.

* cited by examiner

100

400

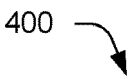

402
Receive domain relationship data describing an organization of one or more domains associated with an access point

404
Generate a graph based on the domain relationship data

406
Change in domain relationship data?

YES

NO

408
Generate a certificate for the access point based on the graph

410
Control traffic between a device and the one or more domains via the access point using the certificate

502
Receive request from a device to access a domain via an access point

504
Identify certificate associated with the access point

506
Domain included in the certificate?

NO                                      YES

508
Deny access by the device

510
Device authenticated via the certificate?

NO

YES

512
Communicate data between the device and the domain via the access point

600

WILDCARD-FREE CERTIFICATES FOR NETWORK ADDRESS DOMAINS

BACKGROUND

With advances in computing device technology, computing devices are increasingly used to perform a variety of computational tasks. Devices are programmed to perform these computational tasks by communicating and exchanging data with other devices, websites, applications, and so forth via networks. To facilitate data transfer among devices, communication infrastructures are used to direct traffic and ensure interoperability (i.e., between applications built on different programming languages). In many communication infrastructures, endpoints (e.g., web service applications) are assigned different access points for other devices to interact with the endpoint.

Each access point is often associated with dedicated services or data offered by the endpoint. For instance, in an example scenario where an endpoint represents a web service application for a digital marketplace entity, one access point is associated with browsing services, another access point is associated with payment services, and so forth. A critical aspect in facilitating data transfer is trust, which is established between endpoints (e.g., a client device and a web service application) when accessing data via an access point. Trust is often established by a secure communication protocol to ensure legitimacy of transferred data, such as by using certificates signed by a trusted authority.

SUMMARY

Techniques are described for generating an access point certificate based on a graph that defines relationships between an access point and at least one domain associated with the access point (e.g., domains and subdomains associated with a network address accessible by computing devices, applications, and so forth). The techniques described herein are implemented using methods, systems, computer-readable storage media, and combinations thereof. Relationship data describing how data is to be routed between an access point and domains (e.g., via at least one origin server hosting the data, at least one proxy for an origin server, and so forth) is received by a certificate management system. The certificate management system generates an access point graph that represents an access point, each domain, each subdomain thereof, each origin server, each proxy, and so forth as nodes in the graph, with edges connecting various nodes to model relationships between a network address and various domains.

Using the access point graph, a certificate is generated for the access point that individually lists each domain and subdomain associated with the access point and includes information describing a routing for data traffic between the access point and domain or subdomain. In this manner, the access point certificate is generated without wildcard entries representing multiple domains or multiple subdomains via a single entry. The certificate is used to control data communication traffic via the access point and is continuously updated responsive to changes in in domain relationship data for the access point.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In some implementations, entities represented in the figures are indicative of one or more entities and thus reference is made interchangeably to single or plural forms of the entities in the discussion.

FIG. 4 is a flow diagram depicting a procedure in an example implementation in which the certificate management system of FIG. 1 generates a certificate for an access point based on a graph of domain relationship data for the access point.

DETAILED DESCRIPTION

Overview

Figure 1:
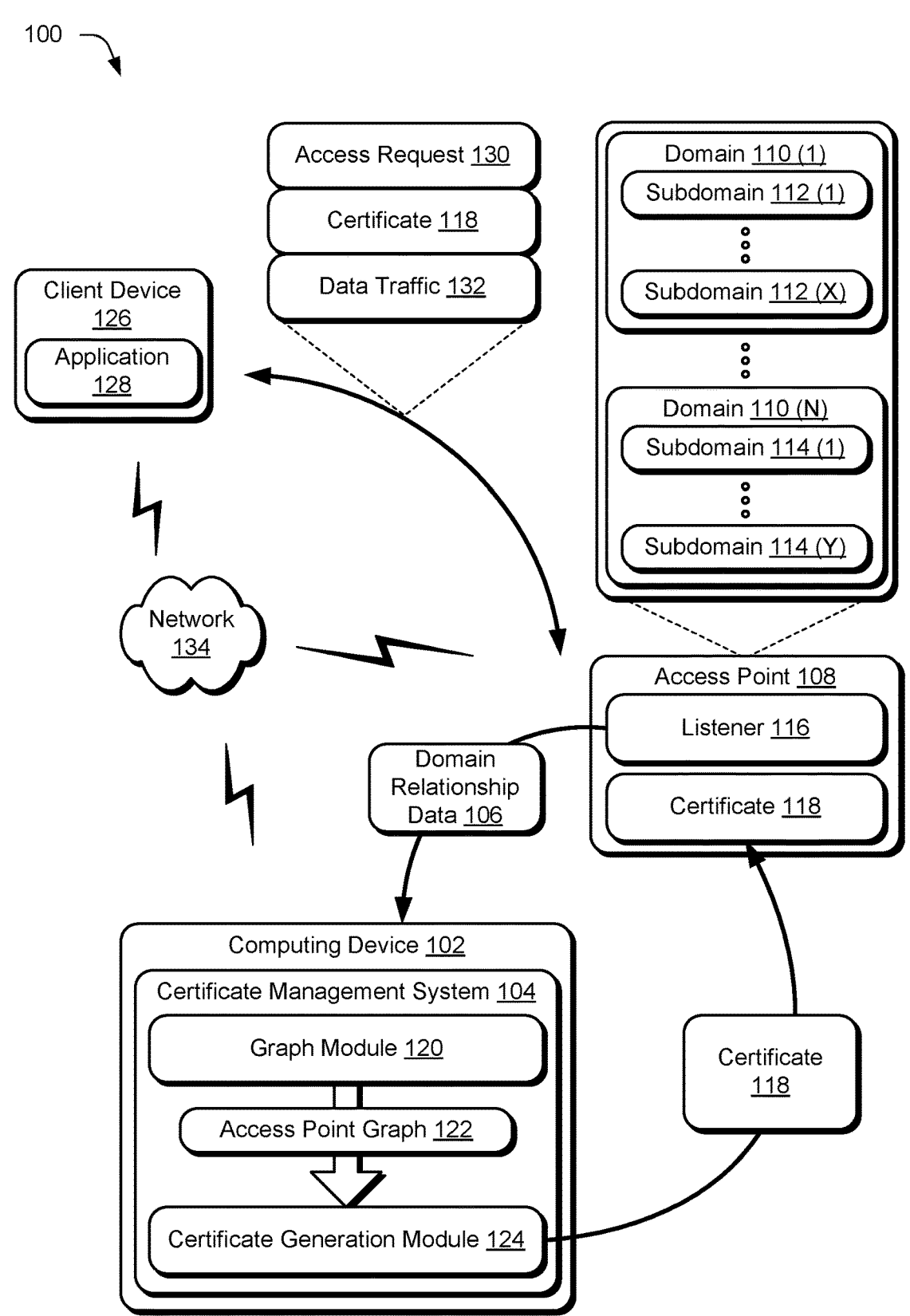
FIG. 1 is an illustration of an environment in an example implementation that is operable to employ a certificate management system to generate certificates for an access point based on a graph of domain relationship data for the access point.

A critical aspect in facilitating data transfer is trust, which is established between endpoints (e.g., a client device and a web service application) when communicating data via an access point. Trust is often established by a secure communication protocol to ensure legitimacy of transferred data, such as by using certificates issued by a trusted authority. For instance, entities inform trusted certificate providers of an intent to host a service (e.g., a web service application) using a domain name (e.g., www.example.com) and request the certificate providers to issue a certificate that authorizes traffic (e.g., data communication) via an access point (e.g., an internet protocol (IP) address, virtual IP address, etc.) that can be trusted by devices (e.g., client devices accessing the web service application via the access point). The certificate authority then generates a certificate that is used to secure communication between a client and a domain via the access point and contains information about the domain (e.g., an entity associated with the domain, its public key, a validity period, and so forth).

However, as Domain Name System (DNS) topology continues to increase in scale, the organization and structure of DNS servers, proxies, and clients accessing domains hosted on the DNS servers becomes increasingly complex and harder to manage. To accommodate this increase in DNS scale, Subject Alternative Names (SAN) are often implemented to allow a single certificate to be used for multiple domain names or subdomains associated with an access point. For instance, a certificate for an entity that includes different domains and subdomains that can be accessed via a common access point includes a SAN list of the different domains and subdomains. Unused domain names (e.g., domain names that were previously used by an entity but are no longer in use) are not conventionally removed from certificate SAN lists, which results in bloated SAN lists that include domain names not actively in use.

This problem is further compounded when entities introduce multiple region-specific (e.g., country or other geographic location-specific) domain names, such as example-.com.uk for the United Kingdom and example.com.de for Germany, and implement proxies to handle traffic via the access point and one or more servers on which domain data is stored. For instance, due to different rules regarding data traffic for different regions, entities experience a significant increase in network traffic, both within an entity's own infrastructure and at the proxy level. As an example of a proxy level, entities frequently employ Content Delivery Networks (CDNs), which improve the performance, availability, and security of websites, applications, and other domain data by distributing data across multiple servers located in various geographic locations. A CDN proxy, also referred to as a Hypertext Transfer Protocol (HTTP) proxy or reverse proxy, acts as an intermediary between a client device and an origin server that hosts content and/services associated with a domain name. In implementations where an entity uses proxies, when a client device requests content from a website or application, the proxy handles the request and determines the most efficient way to serve the content.

For instance, when a CDN proxy receives a request for content, the proxy first checks whether it has a cached copy of content stored locally (e.g., in one or more of the proxy's local servers). If the content is cached and valid (e.g., not expired), the proxy directly serves the content form its local cache. If the requested content is not in the local cache or if the cache has expired, the CDN proxy fetches the content from the origin server and stores a copy in its local cache. In some implementations, the proxy distributes the content to edge servers located in different geographical locations. By strategically positioning edge servers in different regions, in different internet service provider data centers, and so forth, proxies store content closer to client devices, which reduces latency and ensures faster content delivery. Proxies additionally offer load balancing techniques to distribute traffic among edge servers in an efficient manner, thus distributing data traffic and preventing a single endpoint (e.g., server) from being overwhelmed with requests.

Generating certificates that account for various domains, subdomains, origin servers, and proxies associated with a given access point is thus a cumbersome process, particularly for entities that have numerous (e.g., thousands) of subdomains allocated to different origin servers and proxies, while being associated with a single access point. To account for this increasing scale, conventional certificate generation approaches implement wildcard entries to account for different domains via a single certificate entry. Wildcard entries often use a single character (e.g., "*") to represent multiple subdomains of a single domain. For instance, a certificate wildcard entry of "example.com.*" represents "example-.com" as well as "example.com.uk," "example.com.de," "example.com.au," and so forth. Although wildcard entries permit entities to conveniently adjust domain relationships (e.g., add an additional geographic subdomain without modifying a certificate for the domain), wildcard entries present significant security and compliance concerns.

For instance, wildcard entries create an increased attack surface by allowing an impersonator to easily impersonate a subdomain, can obfuscate visibility into security configurations (e.g., Secure Sockets Layer and Transport Layer Security encryptions), exposing multiple servers to a compromised private key of one server, compliance issues, and so forth. These security concerns are further compounded by CDN proxies, where entities that have a large number of subdomains or consistently create and destroy subdomains experience issues managing where the wildcard certificate is installed, leading to situations where servers are incorrectly configured or where an expired or revoked certificate is still being used.

To address these problems facing conventional certificates management, a certificate management system is described that receives information describing relationships between an access point and one or more domains associated with the access point. The certificate management system generates a graph that defines relationships between an access point and at least one domain associated with the access point (e.g., domains and subdomains associated with a network address such as an IP address or a virtual IP address that is accessible by computing devices, applications, and so forth). In the graph, the access point and each associated domain, subdomain, origin server, proxy, etc. as nodes in the graph, with edges connecting various nodes to model relationships between the access point and various domains/subdomains. After constructing the graph, the certificate management system generates a certificate for the access point based on the graph, such that the certificate individually lists each domain and subdomain associated with the access point and includes information describing a routing for data traffic between the access point and domain or subdomain (e.g., via an origin server or a proxy). Advantageously, the certificate is generated independent of (e.g., without) a wildcard entry that represents multiple domains or multiple subdomains via a single entry. In this manner, the certificate generated in accordance with the described techniques does not include a wildcard entry and avoids the security and compliance concerns facing conventional certificates as described above. The certificate is then used to control data communication traffic via the access point.

The certificate management system is configured to receive an indication upon a change in relationship between an access point and one or more domains associated with the access point. For instance, as described herein a change in a relationship between a domain and an access point occurs when a domain, or subdomain thereof, is migrated (e.g., from an origin server to a proxy, between different proxies, and so forth). Alternatively or additionally, a change in relationship between a domain and an access point refers to an additional domain or subdomain being associated with the access point, or a removal of a domain or subdomain from being associated with the access point. Alternatively or additionally, a change in relationship between a domain and an access point refers to an expiration of a certificate associated with the access point. In response to the change to the relationship between an access point and one or more domains, the certificate management system generates an updated graph representing the current relationships and generates a new certificate for the access point based on the updated graph. In this manner, certificates are continuously generated for an access point and used to control the flow of data traffic between a client device and at least one domain via the access point.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld or wearable configuration such as a tablet or mobile phone), and so forth. Thus, the computing device 102 ranges from full resource devices with substantial memory and processor resources (e.g., personal computers, game consoles) to low-resource devices with limited memory and/or processing resources (e.g., mobile devices). Additionally, although described in the context of a single computing device 102, the computing device 102 is representative of a plurality of different devices, such as multiple servers utilized to perform operations "over the cloud."

In the illustrated example, the computing device 102 includes a certificate management system 104. The certificate management system 104 is representative of functionality of the computing device 102 to receive domain relationship data 106 for an access point 108. As described herein, the access point 108 refers to a location where an exchange of data takes place. For instance, in the context of Internet Service Providers (ISPs), the access point 108 is representative of a public exchange facility where ISPs can connect with one another to allow exchange of traffic between different ISP networks, thus enabling data from one ISP's clients to reach clients on another ISP's network. Access points are a critical part of network infrastructures and include physical locations (e.g., data centers) where different networks, services, and devices are connected to one another via routers, switches, and so forth. In the context of wireless network communications, telecommunications, and so forth, the access point 108 is representative of a device such as a router or a hub that provides connectivity for devices to a network. In some implementations, the access point 108 is associated with a network address, such as an IP address, a virtual IP address, and so forth, thus representing a device that provides connectivity between different endpoints (e.g., different devices) for data communication. For instance, in implementations where the access point 108 represents a virtual IP address, the access point 108 is accessible by one or more physical network interfaces, one or more devices, or combinations thereof.

The domain relationship data 106 is representative of information describing an association between the access point 108 and at least one domain. For instance, in the illustrated example of FIG. 1, access point 108 is depicted as being associated with a plurality of domains, represented as domain 110(1) to domain 110(N), where N represents any integer. Each domain 110 associated with the access point 108 is further depicted as including at least one subdomain. For instance, domain 110(1) is depicted as including subdomain 112(1) to subdomain 112(X) and domain 110(N) is depicted as including subdomain 114(1) to subdomain 114(Y), where X and Y each represent any integer. In an example implementation, each subdomain for a domain represents a different service associated with the domain. Alternatively or additionally, each subdomain is associated with a different geographic region for a domain (e.g., in response to a request to access domain 110(1) from a first geographic location, traffic is routed to subdomain 112(1) and in response to a request to access domain 110(1) from a second geographic location, traffic is routed to subdomain 112(X)). These example usages of different subdomains for a domain are merely illustrative and are not intended to be limiting, as the techniques described herein are extendable to any suitable configuration of domains and subdomains thereof that are associated with access point 108.

In implementations, the access point 108 facilitates access to content hosted on a domain 110—and/or subdomain thereof, such as a subdomain 112 or a subdomain 114—by routing data communications between the domain 110 and the access point 108 via one or more intermediary devices. For instance, in a basic implementation, data retrieved from each domain 110 associated with access point 108 is hosted on a single origin server and the access point 108 facilitates data transfer between the origin server and one or more clients (e.g., computing devices, applications, services, combinations thereof, and so forth). In other implementations, data retrieved from different domains 110, subdomains 112, and subdomains 114 is routed via one or more proxies, multiple origin servers, or combinations thereof via the access point to one or more clients. The domain relationship data 106 is further representative of information describing how data is to be routed via the access point 108 from different domains 110, subdomains 112, and subdomains 114 (e.g., directly from an origin sever, via a proxy, and so forth).

In implementations, the domain relationship data 106 is received by the certificate management system 104 from a listener 116 associated with the access point 108. The listener 116 is representative of a component of the access point 108 that identifies configuration settings defining a relationship between the access point 108 and a domain 110, a subdomain 112, a subdomain 114, an origin server, a proxy, or combinations thereof. For instance, the domain relationship data 106 defines how a request for data from a certain subdomain (e.g., subdomain 112(1)) is to be routed from an origin server or a proxy to a client, via the access point 108, from which the request was received.

In implementations, the listener 116 is configured as a software component or a service of the access point 108 that monitors and processes incoming network connections and communication requests at the access point 108. Alternatively or additionally, despite being depicted in the illustrated example of FIG. 1 as being implemented at the access point 108, the listener 116 is implemented remotely from the access point 108. The listener 116 is further representative of functionality to manage incoming connections between clients and the domains 110, based on a certificate 118 associated with the access point 108. Alternatively or additionally, the listener 116 operates as a security mechanism to block or restrict unauthorized connections, such as connections that are not explicitly permitted by the certificate 118.

In implementations, the certificate 118 is generated by the certificate management system 104 for the access point 108. To do so, the certificate management system 104 implements a graph module 120 that generates an access point graph 122 based on the domain relationship data 106 for the access point 108. In this manner, the access point graph 122 is representative of a data structure defining relationships between the access point 108, the domains 110, the subdomains 112, and the subdomains 114, as well as any origin servers or proxies implemented by an entity to service access to data and/or services represented by the domains 110, subdomains 112, and subdomains 114. For an example of an access point graph 122, consider FIG. 2.

Figure 2:
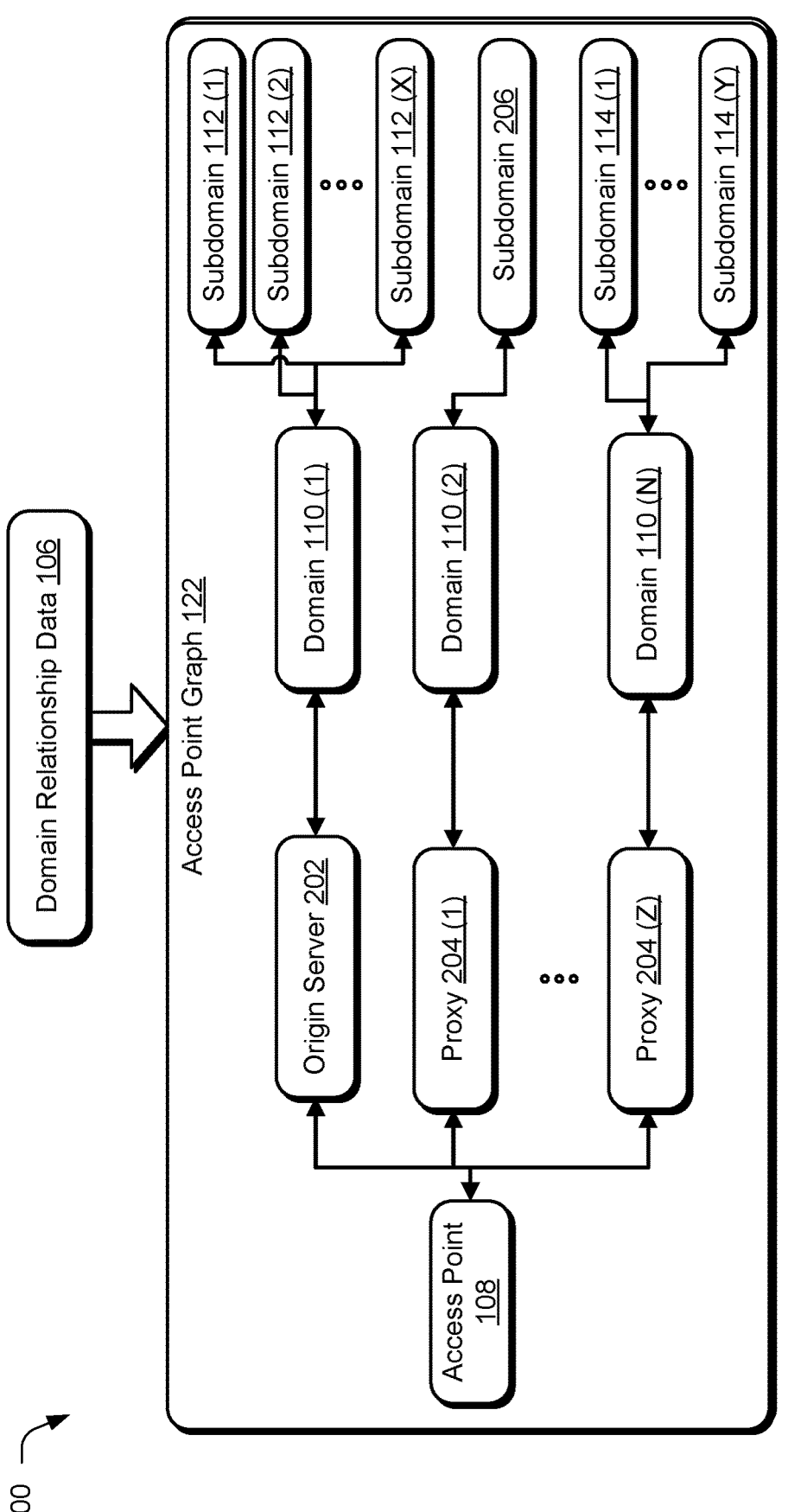
FIG. 2 depicts an example of a graph of domain relationship data used by the certificate management system of FIG. 1 to generate a certificate for an access point.

FIG. 2 depicts an example 200 of a graph of domain relationship data used by the certificate management system 104 to generate the certificate 118 for access point 108. In the illustrated example 200, the access point graph 122 is generated from domain relationship data 106 describing how access point 108 is associated with domain 110(1), domain 110(2), and domain 110(N). The access point graph 122 further represents how domain 110(1) is associated with a plurality of subdomains, represented in the illustrated example 200 as subdomain 112(1), subdomain 112(2), and subdomain 112(X). Similarly, the access point graph 122 represents how domain 110(2) is associated with subdomain 206 and how domain 110(N) is associated with a plurality of subdomains, represented as subdomain 114(1) and subdomain 114(Y). The access point graph 122 further includes information describing how the domain 110(1), along with its subdomains 112(1), 112(2), and 112(X) are assigned to origin server 202, such that requests for data from the domain 110(1), and/or the subdomains 112(1)-(X) are routed from the origin server 202 via the access point 108 to a requesting client.

In a similar manner, the access point graph 122 includes information describing how multiple proxies are used to service data from domain 110(2) and domain 110(N), represented in the example 200 by proxy 204(1) and proxy 204(Z). Although only two proxies 204 are depicted in the illustrated example for simplicity, the access point graph 122 is configured to represent any suitable number of proxies, such that Z represents any integer. Thus, the access point graph 122 represents how requests for data from the domain 110(2) and/or the subdomain 206 are routed from the proxy 204(1) via the access point 108 to a requesting client. Similarly, the access point graph 122 represents how requests for data from the domain 110(N) and/or the subdomains 114(1)-(Y) are routed from the proxy 204(Z) via the access point 108 to a requesting client. In this manner, the access point 108 and its associated domains, subdomains, servers, and proxies are each represented in the access point graph 122 as nodes, with edges defining how data traffic is to be routed between endpoints (e.g., a client and a subdomain) via the access point 108.

Returning to FIG. 1, the certificate management system 104 implements a certificate generation module 124 to generate the certificate 118 for the access point 108 based on the access point graph 122 generated by the graph module 120. The certificate generation module 124 generates the certificate 118 by listing each node of the access point graph 122 as a separate entry in the certificate 118. Advantageously, in contrast to conventional approaches that list multiple domains, multiple subdomains, or combinations thereof using a single wildcard entry, the certificate generation module 124 generates the certificate 118 without wildcard entries (e.g., by listing each node of the access point graph 122 as a separate entry in the certificate 118). As such, the certificate 118 does not include one or more wildcard entries. In a similar manner, in contrast to conventional systems that persist stale or extinct domains and/or subdomains in a certificate, the certificate 118 is continuously updated based on changes in domain relationship data 106, as described in further detail below. As such, the certificate 118 describes only current relationships between the access point 108, domains 110, subdomains thereof, origin servers, and proxies that route communications between the access point 108 and the domains 110.

The certificate generation module 124 additionally generates the certificate 118 to include information describing associations between the different nodes. For instance, consider an example scenario where the origin server 202 represents a first provider hosted by an entity and the proxy 204(1) represents a second provider hosted by a content delivery network that is different than the entity. In this example scenario, the certificate 118 is generated to include information describing how the domain 110(1) and the subdomains 112(1)-(X) are linked to the first provider and how the domain 110(2) and the subdomain 206 are linked to the second provider, thus informing the listener 116 as to how incoming access requests are to be routed. In implementations, the certificate generation module 124 additionally includes security information for the access point 108 in the certificate 118, such as a public key for the access point 108, a digital signature of a trusted authority that vouches for the authenticity of the certificate 118, and so forth. In this manner, the certificate management system 104 is representative of a trusted security authority in accordance with one or more implementations.

For instance, the illustrated example of FIG. 1 depicts a scenario where a client device 126 implementing an application 128 (e.g., a web browser, a dedicated application corresponding to a web service application hosted via one or more of the domains 110, and so forth) transmits an access request 130 to the access point 108. The access request 130 is representative of a connection between the client device 126 and the access point 108 using a secure protocol such as HTTPS (e.g., HTTP over TLS/SSL), which initiates a security handshake. For instance, the access request 130 triggers a TLS handshake, which is a known process by which the client device 126 and the access point 108 establish a secure encrypted connection. As part of the TLS handshake, the access point 108 sends the certificate 118 to the client device 126. The client device 126 then validates the certificate 118 using known certificate validation techniques, such as by checking an expiration date of the certificate 118 to ensure validity, by performing a chain of trust verification to ensure that the signature of a trusted authority is valid using a public key of the trusted authority, performing hostname verification with the access point 108, and so forth.

In implementations, performing hostname verification with the access point 108 involves the client device 126 generating a random session key, encrypting the random session key using a public key for the access point 108 included in the certificate 118, and sending the encrypted session key back to the access point 108. The access point 108 (e.g., using the listener 116) then decrypts the encrypted session key using a private key of the access point 108 to establish a session key for secure communications between the client device 126 and the domains 110 via the access point 108. The secure communications between the client device 126 and the access point 108 are represented in the illustrated example of FIG. 1 as data traffic 132. For instance, the data traffic 132 represents a request for data from subdomain 206 that is routed from proxy 204(1) via the access point 108 to the client device 126, as defined by the certificate 118 and enforced by the access point 108 (e.g., using the listener 116).

In implementations, data is communicated among the computing device 102, the access point 108, and the client device 126 via network 134. The network 134 is representative of any suitable communication architecture configured to connect the computing device 102 to the access point 108 and/or to connect the client device 126 to the access point 108. For instance, the network 134 is representative of a local area network, a wide area network, the Internet, and so forth.

As noted above, the certificate management system 104 is configured to update the certificate 118 for the access point 108 in an ongoing manner, such as at defined intervals, in response to changes in the domain relationship data 106, or combinations thereof. For instance, in response to a configuration change associated with the access point 108, the certificate management system 104 receives updated domain relationship data 106 from the listener 116.

In accordance with the techniques described herein, a change to the domain relationship data 106 occurs in response to certain services and/or data associated with a domain or subdomain being hosted by a different infrastructure (e.g., an origin server 202 or a proxy 204), merged to a common infrastructure, allocated to a different access point, combinations thereof, and so forth.

As a specific example, a change in domain relationship data 106 is detected in response to merging different services for a web application associated with one or more domains that were previously associated with multiple access points to a common access point (e.g., access point 108). Such merging is commonly used when implementing an application programming interface as an access point 108 to facilitate data communication for different aspects of a web service application, when a single-sign on is implemented to perform authentication at a single access point 108, when locally hosted services are offloaded to a content delivery network, when a service mesh is implemented by a single access point 108 to provide load balancing and fault tolerance, and so forth.

As another example, a change to the domain relationship data 106 occurs in response to allocation of different domains 110, or subdomains thereof, that were previously associated with the access point 108 to a different access point. In implementations, allocating services and/or data associated with a domain or subdomain is commonly performed to provide scalability, fault isolation, security, geographic distribution, regulatory compliance, and service-specific optimizations. For instance, as web service applications grow, some services may require more resources than others and allocating different access points for each service avoids bottlenecks at a given access point. Similarly, allocation among multiple access points mitigates problems in the event of failure or performance issue at a given access point, reduces latency, enables different access points to cater towards different regulatory guidelines, and so forth. As yet another example, a change to the domain relationship data 106 occurs in response to expiration of the certificate 118.

In response to receiving updated domain relationship data 106 for the access point 108 (e.g., based on a change in the domain relationship data 106 that was previously used to generate the access point graph 122), the certificate management system 104 causes the graph module 120 to generate a modified access point graph 122. For an example of a modified access point graph 122 (e.g., a modified access point graph relative to the access point graph 122 depicted in FIG. 2), consider FIG. 3.

Figure 3:
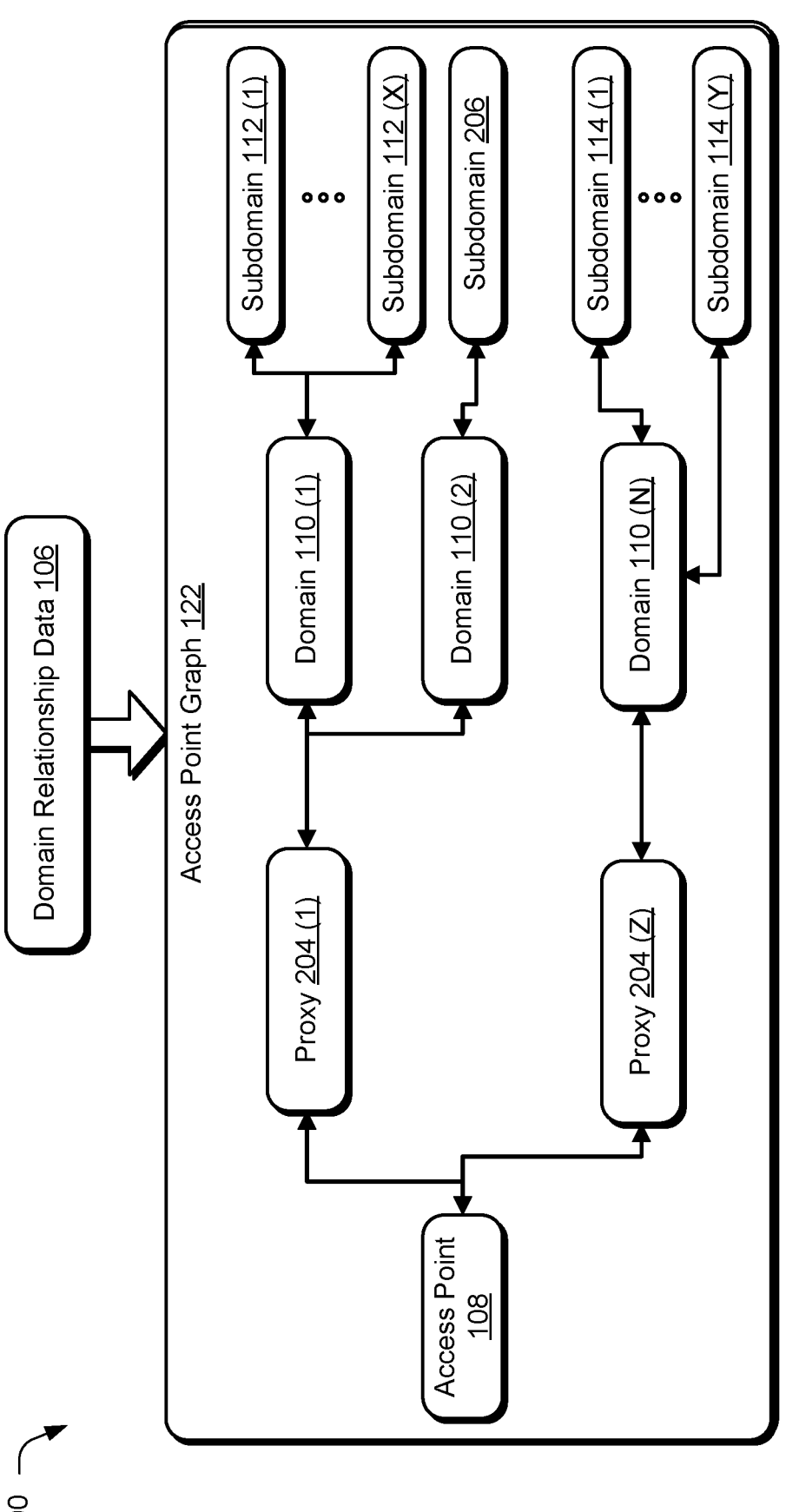
FIG. 3 depicts an example of a different graph of domain relationship data used by the certificate management system of FIG. 1 to generate a different certificate for an access point.

FIG. 3 depicts an example 300 of a modified graph of domain relationship data used by the certificate management system 104 to generate an updated certificate 118 for the access point 108. In the illustrated example 300, the domain relationship data 106 represents changes to the domain relationship data 106 depicted in the illustrated example 200 of FIG. 2. Specifically, the example 300 reflects how the origin server 202 and the subdomain 112(2) are no longer associated with the access point 108. The example 300 further represents how the domain 110(1) and its subdomains 112(1)-(X), excluding subdomain 112(2), are now routed via the proxy 204(1) (e.g., instead of the origin server 202 as previously indicated in FIG. 2). The certificate generation module 124 uses the modified access point graph 122 depicted in FIG. 3 to generate a new certificate 118 for the access point 108, which replaces any certificate previously used by the access point. Thus, while a certificate generated from the access point graph 122 of FIG. 2 would include entries for the subdomain 112(2) and the origin server 202, an updated certificate generated form the modified access point graph 122 of FIG. 3 would not include entries for the subdomain 112(2) and the origin server 202. In this manner, the certificate management system 104 generates certificates for the access point 108 in an ongoing manner responsive to changes in the domain relationship data 106 for the access point 108, thus ensuring that the access point 108 includes a certificate 118 that accurately represents the associated domain relationship data 106. The certificate 118 is thus useable to control traffic between a device and one or more domains via the access point 108 in a manner that avoids security vulnerabilities associated with wildcard entries of conventional certificates. Although described herein in the context of generating a certificate for a single access point, the certificate management system is configured to generate certificates for any number of different access points in accordance with the described techniques.

Having considered example systems and techniques for generating access point certificates, consider now example procedures to illustrate aspects of the techniques described herein.

Example Procedures

The following discussion describes techniques that are configured to be implemented utilizing the previously described systems and devices. In general, functionality, features, and concepts described in relation to the examples above and below are employable in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are configured to be applied together and/or combined in different ways.

Thus, individual functionality, features, and concepts described in relation to different example environments, devices, components, figures, and procedures herein are useable in any suitable combinations and are not limited to the combinations represented by the enumerated examples in this description. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3.

FIG. 4 depicts a procedure 400 in an example implementation in which a certificate management system generates a certificate for an access point based on a graph of domain relationship data for the access point.

Domain relationship data describing an organization of one or more domains associated with an access point is received (block 402). The certificate management system 104, for instance, receives domain relationship data 106 from a listener 116 of the access point 108.

A graph is then generated based on the domain relationship data (block 404). The certificate management system 104, for instance, implements the graph module 120 to generate an access point graph 122 for the access point 108. A determination is made as to whether there is a change in domain relationship data for the access point (block 406). The certificate management system 104, for instance, identifies whether new domain relationship data 106 for the access point 108 is received. In some implementations, the certificate management system 104 periodically queries the access point 108 for domain relationship data 106. Alternatively or additionally, the certificate management system 104 receives the domain relationship data 106 automatically (e.g., without requesting that the domain relationship data 106 be communicated or otherwise provided to the certificate management system 104).

In response to detecting a change in the domain relationship data 106 (e.g., a "Yes" determination at block 406), operation of the procedure 400 returns to block 402, where updated domain relationship data 106 is received by the certificate management system 104. Alternatively, in response to no change detected to the domain relationship data 106 (e.g., a "No" determination at block 406), a certificate is generated for the access point based on the graph (block 408). The certificate generation module 124, for instance, generates the certificate 118 using the access point graph 122 generated by the graph module 120. After and/or during generation of the certificate 118, the certificate management system 104 continues to monitor for a change in the domain relationship data 106, as indicated by the dashed arrow returning to block 406 from block 408, and operation of the procedure 400 continues from block 406 upon a change in the domain relationship data 106.

After generating the certificate, traffic between a device and the one or more domains via the access point is controlled using the certificate (block 410). The certificate management system 104, for instance, communicates the certificate 118 to the access point 108. The listener 116 of the access point 108 then uses the certificate 118 to authenticate an access request 130 by the client device 126 and/or the application 128 and control network 134 between the domains 110 and/or subdomains thereof, via the access point 108. While controlling traffic using the certificate 118, the certificate management system 104 continues to monitor for a change in the domain relationship data 106, as indicated by the dashed arrow returning to block 406 from block 410, and operation of the procedure 400 continues from block 406 upon a change in the domain relationship data 106.

Figure 5:
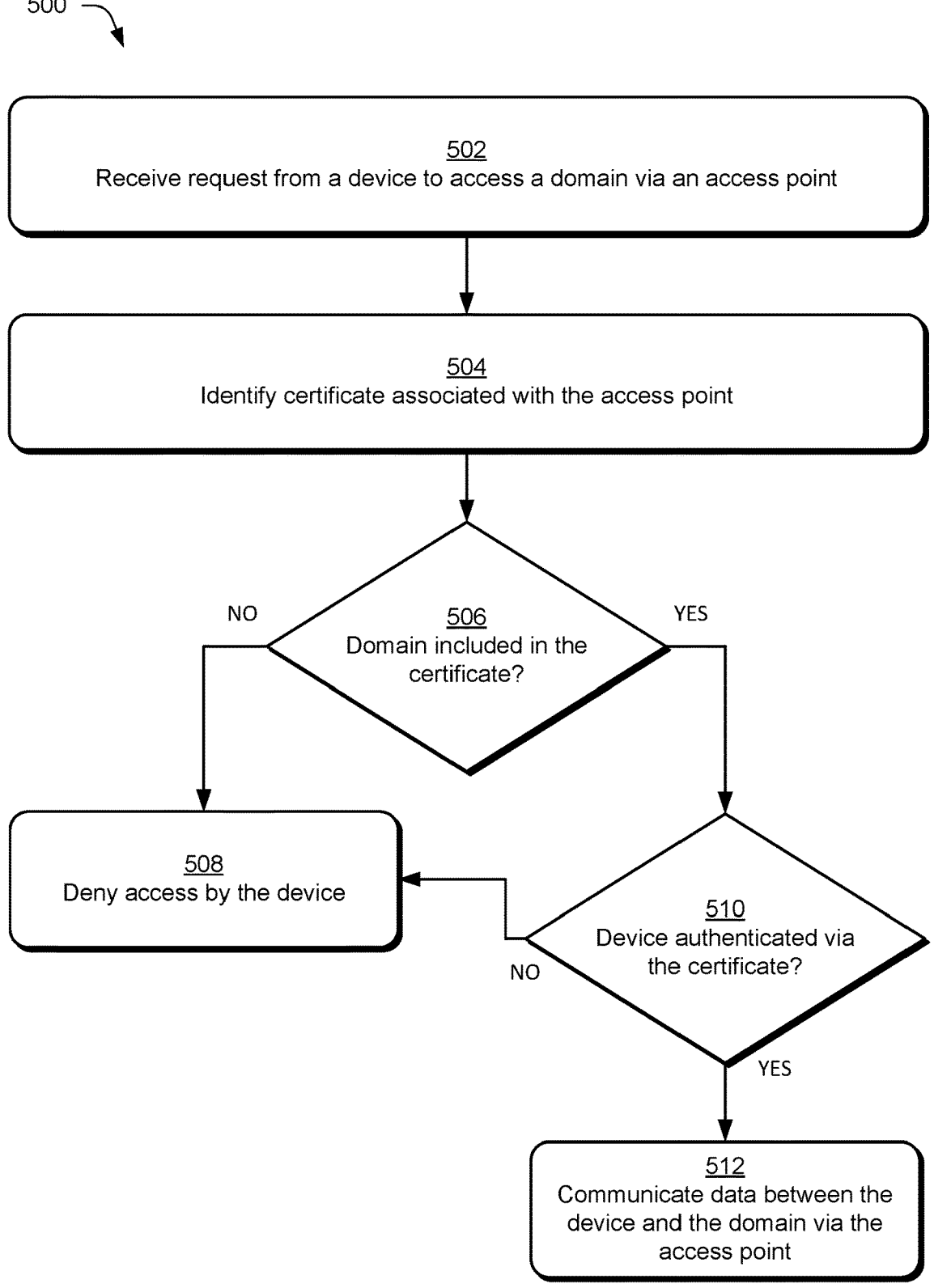
FIG. 5 is a flow diagram depicting a procedure in an example implementation in which a certificate generated by the certificate management system of FIG. 1 is used to control data communication via an access point.

FIG. 5 depicts a procedure 500 in an example implementation in which a certificate generated by a certificate management system is used to control data communication via an access point.

To begin, a request is received from a device to access a domain via an access point (block 502). The access point 108, for instance, receives an access request 130 from the client device 126 to access one or more of the domains 110, one or more of the subdomains 112, one or more of the subdomains 114, or combinations thereof. A certificate associated with the access point is identified (block 504). The listener 116 of access point 108, for instance, identifies certificate 118 generated by the certificate management system 104 for the access point 108.

A determination is then made as to whether the domain is included in the certificate (block 506). The one or more of the domains 110, one or more of the subdomains 112, one or more of the subdomains 114, or a combination thereof is compared with entries of the certificate 118 as generated by the certificate generation module 124 based on the access point graph 122 for the access point 108. In response to identifying that the domain is not included in the certificate (e.g., a "No" determination at block 506), access by the device is denied (block 508). The listener 116, for instance, prohibits the client device 126 from accessing the requested domain via the access point 108.

Alternatively, in response to the domain being included in the certificate (e.g., a "Yes" determination at block 506), a determination is made as to whether the device is authenticated via the certificate (block 510). The listener 116, for instance, communicates the certificate 118 to the client device 126 as part of a security handshake and performs a hostname verification with the client device 126 to establish a secure data communication session between the client device 126 and the access point 108. In response to failing to authenticate the device using the certificate (e.g., a "No" determination at block 510), operation of the procedure 500 returns to block 508 and access by the device is denied.

Alternatively, in response to authenticating the device using the certificate (e.g., a "Yes" determination at block 510), data is communicated between the device and the domain via the access point (block 512). The listener 116, for instance, controls data traffic 132 between the client device 126 and the requested one or more domains 110, one or more of the subdomains 112, one or more of the subdomains 114, or a combination thereof based on the certificate 118 (e.g., according to communication pathways represented by edges that connect nodes of the access point graph 122 from which the certificate 118 is generated).

Having described example procedures in accordance with one or more implementations, consider now an example system and device to implement the various techniques described herein.

Example System and Device

Figure 6:
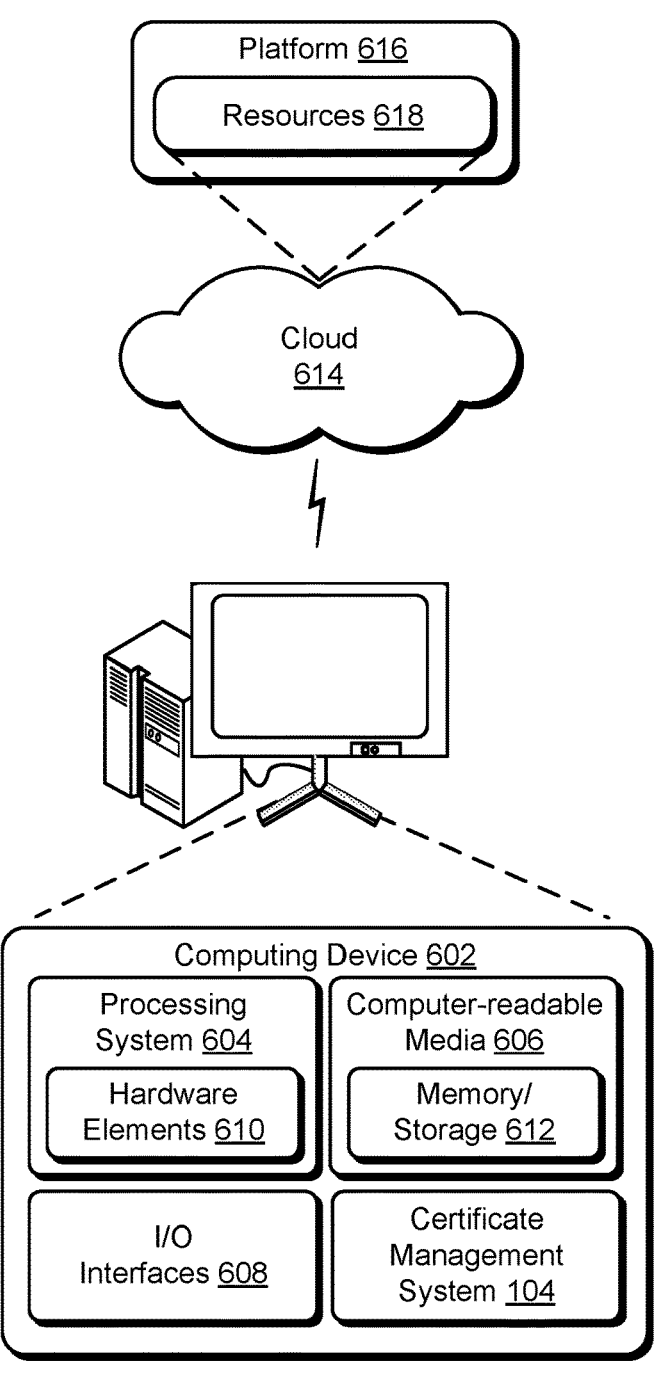
FIG. 6 illustrates an example system including various components of an example device to implement the techniques described with reference to FIGS. 1-5.

FIG. 6 illustrates an example system 600 that includes an example computing device 602, which is representative of one or more computing systems and/or devices that implement the various techniques described herein. This is illustrated through inclusion of the certificate management system 104. The computing device 602 is configured, for example, as a service provider server, as a device associated with a client (e.g., a client device), as an on-chip system, and/or as any other suitable computing device or computing system.

The example computing device 602 as illustrated includes a processing system 604, one or more computer-readable media 606, and one or more I/O interface 608 that are communicatively coupled, one to another. Although not shown, the computing device 602 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that are configurable as processors, functional blocks, and so forth. For instance, hardware element 610 is implemented in hardware as an application specific integrated circuit or other logic device formed using one or more semiconductors. The hardware elements 610 are not limited by the materials from which they are formed or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 606 is illustrated as including memory/storage 612. The memory/storage 612 represents memory/storage capacity associated with one or more computer-readable media. The memory/storage 612 is representative of volatile media (such as random-access memory (RAM)) and/or nonvolatile media (such as read only memory (ROM), Flash memory, optical disks, magnetic disks, and so forth). The memory/storage 612 is configured to include fixed media (e.g., RAM, ROM, a fixed hard drive, and so on) as well as removable media (e.g., Flash memory, a removable hard drive, an optical disc, and so forth). In certain implementations, the computer-readable media 606 is configured in a variety of other ways as further described below.

Input/output interface(s) 608 are representative of functionality to allow a user to enter commands and information to computing device 602, and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 602, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 610. The computing device 602 is configured to implement instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supported by various configurations of the computing device 602 and are not limited to the specific examples of the techniques described herein. This functionality is further configured to be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 include applications and/or data that is utilized while computer processing is executed on servers that are remote from the computing device 602. Resources 618 also include services provided over the Internet and/or through a subscriber network, such as a cellular or Wi-Fi network.

The platform 616 is configured to abstract resources and functions to connect the computing device 602 with other computing devices. The platform 616 is further configured to abstract scaling of resources to provide a corresponding level of scale to encountered demand for the resources 618 that are implemented via the platform 616. Accordingly, in an interconnected device embodiment, implementation of functionality described herein is configured for distribution throughout the system 600. For example, in some configurations the functionality is implemented in part on the computing device 602 as well as via the platform 616 that abstracts the functionality of the cloud 614.

CONCLUSION

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A method comprising:

generating, by a computing device, a graph that defines relationships between a network address and a plurality of different domains, the graph comprising a plurality of nodes that each represent a corresponding one of the plurality of different domains or the network address;

generating, by the computing device, a first certificate for the network address based on the graph, the first certificate listing each of the plurality of nodes in the graph that identify corresponding ones of the plurality of different domains as separate certificate entries;

controlling access to the network address using the first certificate;

detecting, by the computing device, a change to at least one of the relationships between the network address and one or more of the plurality of different domains;

generating, by the computing device, a modified graph based on the change to the at least one of the relationships;

generating, by the computing device, a second certificate for the network address based on the modified graph, the second certificate listing individual nodes in the modified graph as separate certificate entries; and controlling access to the network address using the second certificate instead of the first certificate.

2. The method of claim 1, wherein generating the first certificate is performed without including a single certificate entry that comprises a character indicating multiple subdomains as being valid.

3. The method of claim 1, wherein generating the second certificate is performed without including a single certificate entry that comprises a character indicating multiple subdomains as being valid.

4. The method of claim 1, wherein the network address is served by multiple providers that comprise a first provider hosted by an entity and a second provider hosted by a content delivery network that is different than the entity, wherein the first provider is represented in the graph by a first node and the second provider is represented in the graph by a second node.

5. The method of claim 4, wherein each of the plurality of nodes that represent the plurality of different domains is connected by a link to the first node or the second node in the graph.

6. The method of claim 1, wherein the network address is a virtual internet protocol address configured for access by at least one of a physical network interface or a device.

7. The method of claim 1, wherein detecting the change to the at least one of the relationships is performed based on data received from a listener at the network address that describes at least one configuration change for one or more of the plurality of different domains.

8. The method of claim 1, wherein detecting the change to the at least one of the relationships is performed in response to detecting expiration of the first certificate.

9. A system comprising:

at least one processor; and a computer-readable storage medium storing instructions that are executable by the at least one processor to perform operations comprising:

generating a graph that defines relationships between a network address and at least one domain, the graph comprising a plurality of nodes that each represent a corresponding domain of the at least one domain or the network address;

generating a first certificate for the network address using the graph, the first certificate listing each of the plurality of nodes in the graph that identify corresponding ones of the at least one domain as separate certificate entries;

responsive to a change to a relationship between the network address and the at least one domain, generating a modified graph based on the change to the relationship between the network address and the at least one domain; and generating a second certificate for the network address using the modified graph, the second certificate listing individual nodes in the modified graph as separate certificate entries.

10. The system of claim 9, wherein generating the first certificate is performed without including a single certificate entry that comprises a character indicating multiple subdomains as being valid.

11. The system of claim 9, wherein generating the second certificate is performed without including a single certificate entry that comprises a character indicating multiple subdomains as being valid.

12. The system of claim 9, wherein the network address is served by multiple providers that comprise a first provider hosted by a first entity and a second provider hosted by a second entity that is different than the first entity, wherein the first provider is represented in the graph by a first node and the second provider is represented in the graph by a second node.

13. The system of claim 12, wherein the graph further comprises at least one node that represents a corresponding one of the at least one domain associated with the first entity or the second entity, wherein each node of the at least one node is connected by a link to the first node or the second node in the graph.

14. The system of claim 9, wherein the network address is a virtual internet protocol address configured for access by at least one of a physical network interface or a device.

15. The system of claim 9, the operations further comprising detecting the change to the relationship based on data, generated by a listener at the network address, that describes at least one configuration change for the at least one domain.

16. The system of claim 9, the operations further comprising detecting the change to the relationship responsive to an expiration of the first certificate.

17. The system of claim 9, the operations further comprising controlling access to the network address using the second certificate instead of the first certificate.

18. A method comprising:

receiving, at an access point, a certificate generated from a graph that defines relationships between the access point and a plurality of domains, each of the plurality of domains being represented as a separate node in the graph and being listed in the certificate as a separate certificate entry;

receiving, from a device, a request to access data via at least one of the plurality of domains; and responsive to authenticating the device using the certificate, controlling data transfer between the at least one of the plurality of domains and the device based on the relationships between the access point and the at least one of the plurality of domains.

19. The method of claim 18, wherein the certificate does not include a single certificate entry that comprises a character indicating multiple subdomains as being valid.

20. The method of claim 18, wherein the access point is a virtual internet protocol address configured for access by at least one of a physical network interface or a device.

\* \* \* \* \*